United States Patent [19]

Matsuyama

[11] Patent Number: 4,609,997
[45] Date of Patent: Sep. 2, 1986

[54] INPUT PROCESSOR

[75] Inventor: Shigeru Matsuyama, Tokyo, Japan

[73] Assignee: Canon Kabushiki Kaisha, Tokyo, Japan

[21] Appl. No.: 777,853

[22] Filed: Sep. 18, 1985

Related U.S. Application Data

[63] Continuation of Ser. No. 720,473, Apr. 8, 1985, abandoned, which is a continuation of Ser. No. 529,667, Sep. 6, 1983, abandoned, which is a continuation of Ser. No. 265,159, May 19, 1981, abandoned.

[30] Foreign Application Priority Data

May 30, 1980 [JP] Japan .................. 55-71542

[51] Int. Cl.$^4$ .................. G06F 9/06; G06F 7/38
[52] U.S. Cl. .................. 364/900; 364/709
[58] Field of Search ............. 364/200, 900, 700, 709, 364/715

[56] References Cited

U.S. PATENT DOCUMENTS

| | | | |
|---|---|---|---|
| 3,553,445 | 1/1971 | Hernandez | 364/900 |
| 3,764,791 | 10/1973 | Kashio | 364/709 |
| 3,803,555 | 4/1974 | Mayne et al. | 364/900 |
| 3,996,562 | 12/1976 | Reach et al. | 364/900 |
| 4,112,495 | 9/1978 | Easley | 364/200 |
| 4,121,760 | 10/1978 | Cochran et al. | 364/700 |
| 4,276,606 | 6/1981 | Harigaya et al. | 364/709 |
| 4,279,022 | 7/1981 | Abe | 364/900 |
| 4,302,816 | 11/1981 | Yamamoto | 364/709 |
| 4,347,579 | 8/1982 | Matsuyama | 364/709 |

Primary Examiner—Gareth D. Shaw
Assistant Examiner—Daniel K. Dorsey
Attorney, Agent, or Firm—Fitzpatrick, Cella, Harper & Scinto

[57] ABSTRACT

An input processor such as table calculator comprises input means for putting numerical data in said processor; memory means for storing first n-digit numerical data put in by said input means; reading means for reading out said stored first n-digit data from said memory means and processing means for arranging said first n-digit numerical data read out by said reading means and second m-digit numerical data newly put in by said input means in neighboring relation thereby forming a new n+m-digit numerical data therefrom.

39 Claims, 2 Drawing Figures

| SEQUENCES | OPERATIONS | | REGISTER R1 | REGISTER R2 | REGISTER NR |
|---|---|---|---|---|---|
| | MODE SWITCH | KEY | | | |
| 1 | N MODE | [1] | 1. | 0. | 0. |
| 2 | N MODE | [2][3] | 123. | 0. | 0. |
| 3 | P MODE | [0] | 1230. | 0. | A |
| 4 | P MODE | [0][0] | 123000. | 0. | A A A |
| 5 | N MODE | [+] | 123000. | 123000. | A A A |
| 6 | N MODE | [4] | 4. | 123000. | A A A |
| 7 | N MODE | [5][6] | 456. | 123000. | A A A |
| 8 | N MODE | [FN] | 456000. | 123000. | A A A |

INPUT PROCESSOR

This application is a continuation of application Ser. No. 720,473 filed Apr. 8, 1985 now abandoned, which is a continuation of Ser. No. 529,667, filed Sept. 6, 1983, now abandoned, which is a continuation of Ser. No. 265,159 filed May 19, 1981, now abandoned.

BACKGROUND OF THE INVENTION

1. Field of the Invention

The present invention relates to an input processor such as table calculator, teller's machine or the like which facilitates the input of numerical values, which are generally used repeatedly or frequently, in a simplified sequence.

2. Description of the Prior Art

In the art a table calculator is known which is provided with a particular key for input of particular numerical values that are used frequently or repeatedly. Such particular key usually provided in the prior art apparatus is a [00] key or a [000] key. The purpose for which the [00] key or the [000] key is provided is to simplify the input operation of "0". When "00" or "000" must be put in using [0] key, the key has to be repeatedly pressed twice or three times. The use of a [00] key or a [000] key eliminates the trouble of repeating the key operation. Input of "00" or "000" can be performed by pressing the [00] key or 000 key only once.

However, [00] or [000] keys only can be used as a substitution for double or triple key operation of the 0 key. When any value other than "0" is to be put in repeatedly two or more times or when it is wished to put in any frequently used numerical data in a series only by one key operation, the [00] or [000] keys can not be used at all. In such case, [00] or [000] keys becomes useless and no merit of simplified key operation is obtainable.

SUMMARY OF THE INVENTION

Accordingly, it is a general object of the present invention to provide an input processor which provides the above mentioned function, not found in the prior art apparatus, to simplify the key input operation.

According to the invention, the function of performing repeated inputs of one and the same numerical value by one key input operation is so extended as to cover all numerical values. The advantages of simplified key operation are obtainable for any numerical value the input of which is wished to input repeatedly into the apparatus. Thus, the versatility of the input processor in respect of the above function is remarkably improved as compared with the prior art.

More specifically, it is an object of the invention to provide an input processor which comprises input means for putting numerical data in the processor, memory means for storing first n-digit numerical data put in by said input means, reading means for reading out said stored first n-digit numerical data from said memory means and processing means for arranging said first n-digit numerical data read out by said reading means and second m-digit numerical data newly put in by said input means in a neighboring relation thereby forming new n+m-digit numerical data.

It is another object of the invention to provide an input processor which comprises input means for putting numerical data in the processor, first memory means for storing the numerical data put in by said input means, second memory means for storing a desired portion of said input data, reading means for reading out said portion of the input numerical data from said second memory means and processing means for combining said portion of the input numerical data read out by said reading means and numerical data newly put in by said input means into one thereby forming new numerical data.

It is a further object of the invention to provide an input processor which comprises input means for putting numerical data in the processor, memory means for storing the numerical data put in by said input means, discriminating means for discriminating a desired portion of the numerical data to be stored in said memory means from the remaining portion thereof, reading means for reading out said discriminated portion of the input numerical data and processing means for combining said portion of the input numerical data newly read out by said reading means and the numerical data put in by said input means into one thereby forming new numerical data.

Other and further objects, features and advantages of the invention will appear more fully from the following description taken in connection with the accompanying drawing.

DESCRIPTION OF THE PREFERRED EMBODIMENTS

Figures 1, 2:
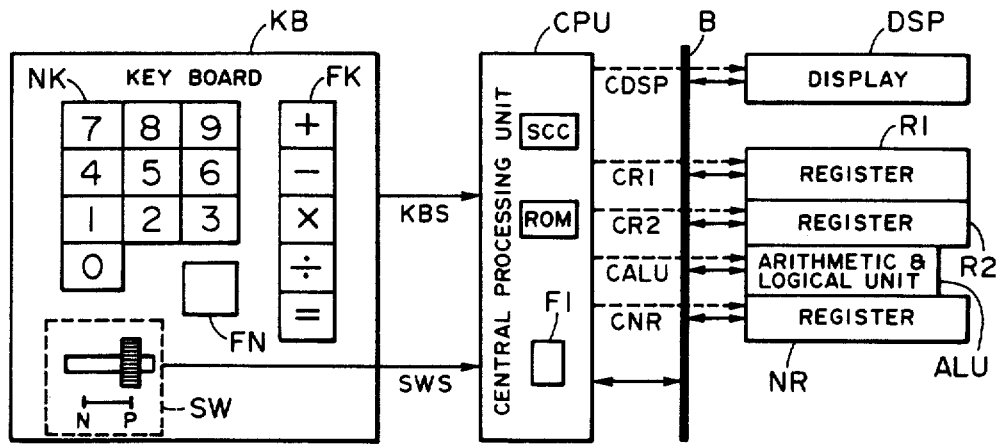
FIG. 1 is a block diagram of an input processor showing an embodiment of the present invention.
FIG. 2 is an operation chart showing examples of sequence and key operation in the embodiment.

FIG. 1 schematically shows an embodiment of an input processor according to the invention.

Designated by KB is a key board on which are arranged a set of numerical input keys NK i.e. [0] to [9], a set of function keys FK i.e. [+], [−], [×], [÷], [=] etc., a mode switch SW and an execution key FN. The mode switch SW can be switched over between two positions for a P mode and for an N mode. In the P mode, a series of numerical data as desired are written in a register as will be described later. In the N mode, numerical data previously written in are input-processed in response to actuation of the execution key FN.

CPU is a central processing unit for receiving various signals from the key board KB, a display device DSP, registers R1, R2, arithmetic & logical unit ALU and numerical sequence register NR and delivering thereto various control signals CDSP, CR1, CR2, CNR, CALU, etc. The central processing unit CPU may comprise a sequence control circuit SCC, a flag such as flip-flop F1 and a read-only memory ROM. The sequence control circuit SCC is, for instance, composed of a clock pulse generator, delay circuit, gate circuit and other logical circuits. The function of flag F1 is to memorize when a function key FK has been actuated. The read-only memory ROM stores programmed microinstructions for feeding control signals to the respective parts of the apparatus. Each of the registers R1 and R2 may be formed as a 4-bit parallel register. Register R1 is used to store therein input numerical data as well as data resulting from an arithmetic operation. Register R2 is used to store therein data on which arithmetic operations are to be performed. The numerical sequence register NR may be formed of, for instance, a 4-bit parallel register. When the mode switch SW is in the P mode, the data keyed in are coded and stored in the numerical sequence register NR. The data stored in the register NR are input-processed when the execution key FN is actuated after changing over the mode switch SW to the N mode. For instance, if the numerical sequence register NR has a code of "12AA" stored therein as explained hereinafter, an input operation of [1], [2], [0], [0] will be executed when the execution key FN is pushed down. Data in the registers R1 or R2 is displayed in a visible form on a display device DSP.

The arithmetic & logical unit ALU performs arithmetic operations such as addition and subtraction on the data introduced therein through a bus line B.

The central processing unit CPU receives the signal KBS from the key board KB and also detects the positions of other circuits. The CPU can generate the following various control signals in response to the signal KBS:

Control signal CDSP for controlling the display device DSP in order to make DSP edit and display the data delivered thereto through the bus line B; control signal CR1 for transmitting data from the register R1 to the bus line B or from the bus line to register R1; control signal CR2 for transmitting data from register R2 to line B or from line B to register R2; control signal CNR for transmitting data from register NR to line B or from line B to register NR and control signal CALU for transmitting data from unit ALU to line B or from line B to unit ALU and also for giving unit ALU an instruction to carry out an arithmetic operation such as addition or subtraction on the data transmitted to unit ALU through the bus line B and the data in the arithmetic & logical unit ALU.

The manner of operation of the table calculator shown in FIG. 1 will be described hereinafter with reference to FIG. 2 showing the sequence of operations.

FIG. 2 shows as an example, key operation sequences and changes of the contents in registers R1, R2 and NR resulting from the operations in the respective sequences. The sequences and operations are as follows:

Sequence 1

At first, the mode switch SW is switched over to the N mode and then the numerical key [1] is actuated. By this key operation, a corresponding key signal KBS is introduced into the central processing unit CPU which then transmits a control signal CR1 to the register R1. Thus, data "1" is stored in it.

Sequence 2

Numerical keys [2] and [3] are sequentially actuated. By this key operation there is stored in the register R1 data of "123" in the same manner as above.

Sequence 3

The mode switch SW is switched over from the N mode to the P mode. A numerical key [0] is pushed down. A key signal KBS corresponding to the key operation and a mode switch signal SWS are introduced into the unit CPU which, in turn, sends a control signal CR1 to the register R1 so as to make "1230" stored in R1. At the same time, by means of the mode switch signal SW, the central processing unit CPU detects the change-over of the mode from the N to the P mode and then codes the key signal from the [0] key, for instance, into "A". The coded signal "A" is then stored in the numerical sequence register NR.

Sequence 4

Numerical key [0] is actuated twice. By this key operation there are stored in the register R1 data of "123000" and also in the numerical sequence register NR "AAA" in the same manner as above.

Sequence 5

The mode switch SW is switched over to the N mode and a function key, that is, the addition key [+] is actuated. In response to the key operation, a corresponding key signal KBS is introduced into unit CPU which in turn sends control signals CR1, CR2 and CALU to R1, R2 and ALU respectively. Thereby the data "0" in the register R2 and the data "123000" in the register R1 are added together. The result of this addition, "123000" is stored in R2. Also, the flag 1 in CPU is set to memorize that a function key FK was pressed.

Sequence 6

A numerical key [4] is actuated. A key signal KBS corresponding to the key operation is introduced into CPU. Detecting that the flag F1 is now in its set position, CPU clears the register R1 and store "4" anew in the register. Then, the unit CPU resets the flag 1.

Sequence 7

Numerical keys [5] and [6] are sequentially actuated. This key operation stores "456" in the register R1.

Sequence 8

The execution key FN is pressed. A key signal KBS corresponding to the key operation is introduced into unit CPU. In response to the key signal, unit CPU sends a control signal CNR to the numerical sequence register NR to sequentially read out the key code data "AAA" previously stored in NR. Since the key code data "A" is a coded signal corresponding to the key signal of numerical key [0], the key code signal "AAA" now read out from register NR represents a triple pressing of [0] key. Therefore, "456000" is stored in the register R1.

While the present invention has been particularly shown and described with reference to an example in which the "0" key was actuated three times in series, it is to be understood that the present invention is not limited to repeating inputs of "0" only. The present invention is applicable to any desired numerical value other than 0 in the light of the above teachings. Similarly, there may be used also other operations than switching operation to change over the mode from one for keeping in memory the sequence of continuous numerical input operations to another for executing the sequence and vice versa. For example, the change-over between the above two modes may be carried out employing a key operation alone or a combination of a switching operation and a key operation.

What I claim is:

1. An input processor for processing digits of data and for storing and retrieving a plurality of digits for repeated use in forming data to be processed, said processor comprising:
   processing means for receiving and for processing data;
   input means for inputting digits of data into said processing means;
   memory means coupled to said processing means for storing a desired M-digits of data out of N-digits of data input into said processing means by said input means, M being no greater than N;

mode setting means connected to said processing means and settable in a first mode and a second mode, in said first mode said mode setting means causing said memory means to store said M-digits of data and in said second mode said mode setting means permitting said M-digits of data to be read out from said memory means; and instructing means, comprising an execution key, coupled to said processing means and to said mode setting means; said processing means being responsive to actuation of said execution key when said mode setting means is set in said second mode to cause said M-digits of data to be read out from said memory means and to be appended as the less significant digits of data to the digits of data input by said input means immediately prior to actuation of said execution key, said appended M-digits of data and said digits of data input by said input means immediately prior to actuation of said execution key together thereby forming a plurality of digits of data to be processed by said processing means.

2. An input processor as set forth in claim 1, wherein said input means includes a plurality of numerical value keys for inputting numerical values as information into said processor.

3. An input processor as set forth in claim 1, wherein said memory means includes read-write memory.

4. An input processor for processing digits of data and for storing and retrieving a plurality of digits for repeated use in forming data to be processed, said processor comprising:

processing means for receiving and for processing data;

input means for inputting digits of data into said processing means;

memory means coupled to said processing means for storing M-digits of data representative of a plurality of digits of data input into said processing means by said input means;

mode setting means connected to said processing means and settable in a first mode and a second mode, in said first mode said mode setting means causing said memory means to store said M-digits of data and in said second mode said mode setting means permitting said M-digits of data to be read out from said memory means;

instructing means coupled to said processing means; said instructing means instructing, when said mode setting means is in said first mode, that the M-digits of data be stored in said memory means and instructing, when said mode selecting means is in said second mode, that the stored M-digits of data be read out from said memory means, and said processing means appending the M-digits of data read out from said memory means in response to an instruction from said instructing means to one end of N-digits of data input into said processor by said input means to form new data having M+N digits.

5. An input processor as set forth in claim 4, wherein said input means includes a plurality of numerical value keys for inputting numerical values into said processor.

6. An input processor as set forth in claim 4, wherein said memory means comprises a read-write memory.

7. An input processor for processing digits of data and for storing and retrieving a plurality of digits for repeated use in forming data to be processed, said processor comprising:

processing means for receiving and for processing numerical data;

input means comprising a plurality of keys for inputting numerical data into said processing means;

memory means coupled to said processing means, for sequentially storing a series of numerical data in response to the operation of said keys of said input means;

selecting means coupled to said processing means, for selecting a first mode in which separate operation of any of said keys of said input means causes the series of numerical data input by said operation of said keys of said input means to be stored in said memory means, and for selecting a second mode in which separate operation of any of said keys of said input means causes a series of numerical data stored in said memory means to be read out for processing; and instruction means coupled to said processing means, for generating an instruction that said series of numerical data read out from said memory means be processed in response to the separate operation of any of said keys of said input means when said selecting means is switched from the first mode to the second mode, said processing means appending said series of numerical data read out from said memory means in response to an instruction of said instruction means to other numerical data input into said processing means by said input means to form new sequences of numerical data which include both said series of data read out from said memory means and said other numerical data input by said input means.

8. An input processor as set forth in claim 7, wherein said input means includes a plurality of numerical value keys.

9. An input processor as set forth in claim 7, wherein said memory means includes a read-write memory means.

10. An input processor for processing data composed of a plurality of character information and for storing and retrieving a plurality of character information for repeated use in forming data to be processed, said processor comprising:

processing means for receiving and for processing data;

input means for inputting data composed of a plurality of character information into said processing means;

memory means coupled to said processing means for storing a desired M-pieces of character information of data out of N-pieces of character information of data input into said processing means by said input means, M being no greater than N;

mode setting means connected to said processing means and settable in a first mode and a second mode, in said first mode said mode setting means causing said memory means to store said M-pieces of character information of data and in said second mode said mode setting means permitting said M-pieces of character information of data to be read out from said memory means; and instructing means, comprising an execution key, coupled to said processing means and to said mode setting means; said processing means being responsive to actuation of said execution key when said mode setting means is set in said second mode to cause said M-pieces of character information of data to be read out from said memory means and to be appended as the less significant data composed of a plurality of character information to the data composed of a plurality of character information input by said input means immediately prior to actuation of said execution key, said appended M-pieces of character information of data and said data composed of a plurality of character information input by said input means immediately prior to actuation of said execution key together thereby forming a plurality of pieces of character information of data to be processed by said processing means.

11. An input processor as set forth in claim 10, wherein said input means comprises a plurality of numerical value keys for inputting numerical values as said character information into said processor.

12. An input processor as set forth in claim 10, wherein said memory means comprises a read-write memory.

13. An input processor for processing data composed of a plurality of character information and for storing and retrieving a plurality of character information for repeated use in forming data to be processed, said processor comprising:

processing means for receiving and for processing data;

input means for inputting data composed of a plurality of character information into said processing means;

memory means coupled to said processing means for storing M-pieces of character information of data representative of a plurality of character information of data input into said processing means by said input means; and mode setting means connected to said processing means and settable in a first mode and a second mode, in said first mode said mode setting means causing said memory means to store said M-pieces of character information of data and in said second mode said mode setting means permitting said M-pieces of character information of data to be read out from said memory means;

instructing means coupled to said processing means; said instructing means instructing, when said mode setting means is in said first mode, that the M-pieces of character information of data be stored in said memory means and instructing, when said mode selecting means is in said second mode, that the stored M-pieces of character information of data be read out from said memory means, and said processing means appending the M-pieces of character information of data read out from said memory means in response to an instruction from said instructing means to one end of N-pieces of character information of data input into said processor by said input means, to form new data having M+N pieces of character information.

14. An input processor as set forth in claim 13, wherein said input means comprises a plurality of numerical value keys for inputting numerical values into said processor as said character information.

15. An input processor as set forth in claim 13, wherein said memory means comprises a read-write memory.

16. An input processor for processing data composed of a plurality of character information and for storing and retrieving a plurality of character information for repeated use in forming data to be processed, said processor comprising:

processing means for receiving and for processing numerical data;

input means comprising a plurality of keys for inputting numerical data into said processing means;

memory means coupled to said processing means, for sequentially storing a series of numerical data in response to the operation of said keys of said input means;

selecting means coupled to said processing means, for selecting a first mode in which separate operation of any of said keys of said input means causes the series of numerical data input by said operation of said keys of said input means to be stored in said memory means, and for selecting a second mode in which separate operation of any of said keys of said input means causes a series of numerical data stored in said memory means to be read out for processing; and instruction means coupled to said processing means, for generating an instruction that said series of numerical data read out from said memory means be processed in response to the separate operation of any of said keys of said input means when said selecting means is switched from the first mode to the second mode, said processing means appending said series of numerical data read out from said memory means in response to an instruction of said instruction means to other numerical data input into said processing means by said input means to form new sequences of numerical data which include both said series of data read out from said memory means and said other numerical data input by said input means.

17. An input processor as set forth in claim 16, wherein said input means comprises a plurality of numerical value keys.

18. An input processor as set forth in claim 16, wherein said memory means comprises a read-write memory means.

19. An input processor for processing digits of data and for storing and retrieving a plurality of character information for repeated use in forming data to be processed, said processor comprising:

processing means for receiving and for processing data;

input means for inputting character information of data into said processing means;

memory means coupled to said processing means for storing a desired M-pieces of character information of data out of N-pieces of character information of data input into said processing means by said input means, M being no greater than N;

mode setting means connected to said processing means and settable in a first mode and a second mode, in said first mode said mode setting means causing said memory means to store said M-pieces of character information of data and in said second mode said mode setting means permitting said M-pieces of character information of data to be read out from said memory means; and instructing means, comprising an execution key, coupled to said processing means and to said mode setting means; said processing means being responsive to actuation of said execution key when said mode setting means is set in said second mode to cause said M-pieces of character information of data to be read out from said memory means and to be appended as the less significant pieces of character information of data to the pieces of character information of data input by said input means immediately prior to actuation of said execution key, said appended M-pieces of character information of data and said pieces of character information of data input by said input means immediately prior to actuation of said execution key together thereby forming a plurality of character information to be processed by said processing means.

20. An input processor as set forth in claim 19, wherein said input means comprises a plurality of numerical value keys for inputting numerical values as information into said processor as said character information.

21. An input processor as set forth in claim 19, wherein said memory means comprises a read-write memory.

22. An input processor for processing digits of data and for storing and retrieving a plurality of character information for repeated use in forming data to be processed said processor comprising:
   processing means for receiving and for processing data;
   input means for inputting character information of data into said processing means;
   memory means coupled to said processing means for storing M-pieces of character information of data representative of a plurality of character information input into said processing means by said input means;
   mode setting means connected to said processing means and settable in a first mode and a second mode, in said first mode said mode setting means causing said memory means to store said M-pieces of character information of data and in said second mode said mode setting means permitting said M-pieces of character information of data to be read out from said memory means; and
   instructing means coupled to said processing means; said instructing means instructing, when said mode setting means is in said first mode, that the M-pieces of character information of data be stored in said memory means and instructing, when said mode selecting means is in said second mode, that the stored M-pieces of character information of data be read out from said memory means, and said processing means appending the M-pieces of character information of data read out from said memory means in response to an instruction from said instructing means to one end of N-pieces of character information of data input into said processor by said input means to form new data having M+N pieces of character information.

23. An input processor as set forth in claim 22, wherein said input means comprises a plurality of numerical value keys for inputting numerical values into said processor as said character information.

24. An input processor as set forth in claim 22, wherein said memory means comprises a read-write memory.

25. An input processor for processing digits of data and for storing and retrieving a plurality of character information for repeated use in forming data to be processed, said processor comprising:
   processing means for receiving and for processing numerical data;
   input means comprising a plurality of keys for inputting numerical data into said processing means;
   memory means coupled to said processing means, for sequentially storing a series of numerical data in response to the operation of said keys of said input means;
   selecting means coupled to said processing means, for selecting a first mode in which separate operation of any of said keys of said input means causes the series of numerical data input by said operation of said keys of said input means to be stored in said memory means, and for selecting a second mode in which separate operation of any of said keys of said input means causes a series of numerical data stored in said memory means to be read out for processing; and
   instruction means coupled to said processing means, for generating an instruction that said series of numerical data read out from said memory means be processed in response to the separate operation of any of said keys of said input means when said selecting means is switched from the first mode to the second mode, said processing means appending said series of numerical data read out from said memory means in response to an instruction of said instruction means to other numerical data input into said processing means by said input means to form new sequences of numerical data which include both said series of data read out from said memory means and said other numerical data input by said input means.

26. An input processor as set forth in claim 25, wherein said input means comprises a plurality of numerical value keys.

27. An input processor as set forth in claim 25, wherein said memory means comprises a read-write memory means.

28. An input processor for processing character information of data and for storing and retrieving a plurality of character information for repeated use in forming data to be processed, said processor comprising:
   processing means for receiving and for processing data;
   input means for inputting character information of data into said processing means;
   memory means coupled to said processing means for storing a desired portion of a plurality of character information forming said data input into said processing means by said input means;
   mode setting means connected to said processing means and settable in a first mode and a second mode, in said first mode said mode setting means causing said memory means to store said portion of a plurality of character information forming said data and in said second mode said mode setting means permitting said portion of a plurality of character information forming said data to be read out from said memory means; and
   instructing means, comprising an execution key, coupled to said processing means and to said mode setting means; said processing means being responsive to actuation of said execution key when said mode setting means is set in said second mode to cause said portion of a plurality of character information forming said data to be read out from said memory means and to be appended as the less significant pieces of character information of data to the pieces of character information of data input by said input means immediately prior to actuation of said execution key, said appended portion of a plurality of character information forming said data and said pieces of character information of data input by said input means immediately prior to actuation of said execution key together thereby forming a plurality of pieces of character information of data to be processed by said processing means.

29. An input processor as set forth in claim 28, wherein said input means comprises a plurality of numerical value keys for inputting numerical values as said character information into said processor.

30. An input processor as set forth in claim 28, wherein said memory means comprises a read-write memory.

31. An input processor for processing digits of data and for storing and retrieving a plurality of character information for repeated use in forming data to be processed, said processor comprising:
processing means for receiving and for processing data;
input means for inputting pieces of character information of data into said processing means;
memory means coupled to said processing means for storing a desired M-pieces of character information of data out of N-pieces of character information of data input into said processing means by said input means, M being no greater than N;
mode setting means connected to said processing means and settable in a first mode and a second mode, in said first mode said mode setting means causing said memory means to store a portion of character information of data and in said second mode said mode setting means permitting said portion of character information of data to be read out from said memory means; and
instructing means, comprising an execution key, coupled to said processing means and to said mode setting means; said processing means being responsive to actuation of said execution key when said mode setting means is set in said second mode to cause said portion of character information of data to be read out from said memory means and to be appended as a portion of character information of data to the character information of data input by said input means immediately prior to actuation of said execution key, said appended portion of character information of data and said pieces of character information of data input by said input means immediately prior to actuation of said execution key together thereby forming a plurality of character information of data to be processed by said processing means.

32. An input processor as set forth in claim 31, wherein said input means comprises a plurality of numerical value keys for inputting numerical values as said character information into said processor.

33. An input processor as set forth in claim 31, wherein said memory means comprises a read-write memory.

34. An input processor for processing character information of data and for storing and retrieving a plurality of character information for repeated use in forming data to be processed, said processor comprising:
processing means for receiving and for processing data;
input means for inputting character information of data into said processing means;
memory means coupled to said processing means for storing a portion of said character information of data representative of a plurality of pieces of character information of data input into said processing means by said input means;
mode setting means connected to said processing means and settable in a first mode and a second mode, in said first mode said mode setting means causing said memory means to store said portion of character information of data and in said second mode said mode setting means permitting said portion of character information of data to be read out from said memory means; and
instructing means coupled to said processing means; said instructing means instructing, when said mode setting means is in said first mode, that the portion of character information of data be stored in said memory means and instructing, when said mode selecting means is in said second mode, that the stored portion character information of data be read out from said memory means, and said processing means appending the portion of character information of data read out from said memory means in response to an instruction from said instructing means to one end of N-pieces of character information of data input into said processor by said input means to form new data having the portion of character information of data +N pieces of character information of data.

35. An input processor as set forth in claim 34, wherein said input means comprises a plurality of numerical value keys for inputting numerical values as said character information into said processor.

36. An input processor as set forth in claim 34, wherein said memory means comprises a read-write memory.

37. An input processor for processing digits of data and for storing and retrieving a plurality of character information of data for repeated use in forming data to be processed, said processor comprising:
input means including a plurality of keys for inputting data into said processor;
processing means for receiving and for processing data input by said input means;
memory means coupled to said processing means, for sequentially storing a series of data input by said input means in response to the operation of said keys of said input means;
selecting means coupled to said processing means, for selecting a first mode in which separate operation of any of said keys of said input means causes the series of data input by said input means by said operation of said keys of said input means to be stored in said memory means, and for selecting a second mode in which separate operation of any of said keys of said input means causes a series of data input by said input means and stored in said memory means to be read out for processing; and
instruction means coupled to said processing means, for generating an instruction that said series of data input by said input means and read out from said memory means be processed in response to the separate operation of any of said keys of said input means when said selecting means is switched from the first mode to the second mode, said processing means appending said series of data input by said input means and read out from said memory means in response to an instruction of said instruction means to other data input into said processing means by said input means to form new sequences of data input by said input means which include both said series of data read out from said memory means and said other data input by said input means.

38. An input processor as set forth in claim 37, wherein said input means comprises a plurality of numerical value keys.

39. An input processor as set forth in claim 37, wherein said memory means comprises a read-write memory means.

* * * * *